US011182965B2

(12) United States Patent
Zavesky et al.

(10) Patent No.: US 11,182,965 B2
(45) Date of Patent: Nov. 23, 2021

(54) EXTENDED REALITY MARKERS FOR ENHANCING SOCIAL ENGAGEMENT

(71) Applicant: AT&T Intellectual Property I, L.P., Atlanta, GA (US)

(72) Inventors: Eric Zavesky, Austin, TX (US); Nigel Bradley, McDonough, GA (US); Nikhil Marathe, Palatine, IL (US); James Pratt, Round Rock, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 16/400,406

(22) Filed: May 1, 2019

(65) Prior Publication Data

US 2020/0349768 A1    Nov. 5, 2020

(51) Int. Cl.
| | | |
|---|---|---|
| *G06T 19/00* | (2011.01) | |
| *G06T 15/00* | (2011.01) | |
| *G06F 3/01* | (2006.01) | |
| *G06F 3/16* | (2006.01) | |

(52) U.S. Cl.
CPC .......... *G06T 19/006* (2013.01); *G06F 3/011* (2013.01); *G06F 3/016* (2013.01); *G06F 3/167* (2013.01); *G06T 15/005* (2013.01); *G06T 2207/20092* (2013.01); *G06T 2207/30204* (2013.01)

(58) Field of Classification Search
CPC ............... G06T 19/006; G06T 15/005; G06T 2207/30204; G06T 2207/20092; G06F 3/011; G06F 3/016; G06F 3/167; G06F 3/015
USPC ........................................ 345/633
See application file for complete search history.

(56) References Cited

U.S. PATENT DOCUMENTS

| | | |
|---|---|---|
| 7,505,639 B2 | 3/2009 | Shibasaki et al. |
| 8,375,310 B2 | 2/2013 | Hamilton et al. |
| 9,153,195 B2 | 10/2015 | Geisner et al. |
| 9,286,725 B2 | 3/2016 | Vasquez et al. |
| 9,500,865 B2 | 11/2016 | Chen |
| 9,557,951 B2 | 1/2017 | Bean et al. |

(Continued)

FOREIGN PATENT DOCUMENTS

WO     2015031167 A1    3/2015

OTHER PUBLICATIONS

Kim, Jong Bae. "A personal identity annotation overlay system using a wearable computer for augmented reality." IEEE Transactions on Consumer Electronics 49.4 (2003): 1457-1467. https://booksc.xyz/dl/18417038/1edf87.

(Continued)

*Primary Examiner* — Jennifer Mehmood
*Assistant Examiner* — Kim Thanh T Tran

(57) ABSTRACT

In one example, a method for generating and displaying markers in XR environments to enhance social engagement among users includes presenting, by a processing system, an extended reality environment to a first user, wherein the extended reality environment combines elements of a real world environment surrounding the first user with elements of a virtual world, inferring, by the processing system, a marker to be associated with a second user in the extended reality environment, wherein the marker indicates information about the second user; and modifying, by the processing system, the extended reality environment to incorporate the marker in a manner that is apparent to the first user.

20 Claims, 4 Drawing Sheets

(56) References Cited

U.S. PATENT DOCUMENTS

| | | |
|---|---|---|
| 9,898,863 B2 | 2/2018 | Miyazaya et al. |
| 9,971,403 B1 | 5/2018 | Kallmeyer et al. |
| 9,990,689 B2 | 6/2018 | Lashkari et al. |
| 10,139,985 B2 | 11/2018 | Mildrew et al. |
| 10,209,946 B2 | 2/2019 | Masters |
| 10,229,312 B2 | 3/2019 | Barnett et al. |
| 10,235,810 B2 | 3/2019 | Morrison |
| 10,242,501 B1 | 3/2019 | Pusch et al. |
| 2007/0038944 A1 | 2/2007 | Carignano et al. |
| 2012/0008003 A1 | 1/2012 | Lim et al. |
| 2012/0194549 A1* | 8/2012 | Osterhout ........ G02B 27/0093 345/633 |
| 2012/0270644 A1* | 10/2012 | Buhr ........ A63F 13/71 463/29 |
| 2013/0050258 A1* | 2/2013 | Liu ........ G02B 27/017 345/633 |
| 2013/0050262 A1 | 2/2013 | Jeon |
| 2013/0141419 A1 | 6/2013 | Mount et al. |
| 2014/0055488 A1* | 2/2014 | Masters ........ G06F 3/147 345/633 |
| 2014/0207880 A1* | 7/2014 | Malkin ........ G06F 3/016 709/206 |
| 2015/0035823 A1 | 2/2015 | Arsan et al. |
| 2015/0123966 A1 | 5/2015 | Newman |
| 2016/0071319 A1 | 3/2016 | Fallon et al. |
| 2016/0093108 A1* | 3/2016 | Mao ........ A63F 13/42 345/633 |
| 2016/0125655 A1 | 5/2016 | Tian et al. |
| 2018/0043263 A1 | 2/2018 | Cao |
| 2018/0107839 A1* | 4/2018 | Clement ........ G06F 3/167 |
| 2018/0232056 A1 | 8/2018 | Nigam et al. |
| 2018/0350144 A1 | 12/2018 | Rathod |
| 2019/0020843 A1 | 1/2019 | Reif |
| 2019/0065028 A1* | 2/2019 | Chashchin-Semenov ........ H04L 67/38 |

OTHER PUBLICATIONS

Makita, Koji, Masayuki Kanbara, and Naokazu Yokoya. "View management of annotations for wearable augmented reality." 2009 IEEE International Conference on Multimedia and Expo. IEEE, 2009. https://core.ac.uk/download/pdf/75905483.pdf.

Newman, Joseph, David Ingram, and Andy Hopper. "Augmented reality in a wide area sentient environment." Proceedings IEEE and ACM International Symposium on Augmented Reality. IEEE, 2001. https://pdfs.semanticscholar.org/b734/63a0f53d97aa735c89cbc389988efd1d1897.pdf.

Prinz, Wolfgang. "NESSIE: an awareness environment for cooperative settings." ECSCW'99. Springer, Dordrecht, 1999. https://www.researchgate.net/profile/Wolfgang_Prinz/publication/221553284_NESSIE_An_awareness_environment_for_cooperative_settings/links/09e4150c6e7f24b84c000000.pdf.

Arkadiusz Buras "macbury/lam.py" github, initial commit Feb. 19, 2018. https://github.com/macbury/lam.py.

* cited by examiner

EXTENDED REALITY MARKERS FOR ENHANCING SOCIAL ENGAGEMENT

The present disclosure relates generally to extended reality (XR) systems, and relates more particularly to devices, non-transitory computer-readable media, and methods for generating and displaying markers in XR environments to enhance social engagement among users.

BACKGROUND

Extended reality (XR) is an umbrella term that has been used to refer to various different forms of immersive technologies, including virtual reality (VR), augmented reality (AR), mixed reality (MR), and cinematic reality (CR). Generally speaking, XR technologies allow virtual world (e.g., digital) objects to be brought into "real" (e.g., non-virtual) world environments and real world objects to be brought into virtual environments, e.g., via overlays or other mechanisms. XR technologies may have applications in fields including architecture, sports training, medicine, real estate, gaming, television and film, engineering, travel, and others. As such, immersive experiences that rely on XR technologies are growing in popularity.

SUMMARY

In one example, the present disclosure describes a device, computer-readable medium, and method for generating and displaying markers in extended reality (XR) environments to enhance social engagement among users. For instance, in one example, a method includes presenting, by a processing system, an extended reality environment to a first user, wherein the extended reality environment combines elements of a real world environment surrounding the first user with elements of a virtual world, inferring, by the processing system, a marker to be associated with a second user in the extended reality environment, wherein the marker indicates information about the second user; and modifying, by the processing system, the extended reality environment to incorporate the marker in a manner that is apparent to the first user.

In another example, a non-transitory computer-readable medium stores instructions which, when executed by a processor, cause the processor to perform operations. The operations include presenting an extended reality environment to a first user, wherein the extended reality environment combines elements of a real world environment surrounding the first user with elements of a virtual world, inferring a marker to be associated with a second user in the extended reality environment, wherein the marker indicates information about the second user; and modifying the extended reality environment to incorporate the marker in a manner that is apparent to the first user.

In another example, a device includes a processor and a computer-readable medium storing instructions which, when executed by the processor, cause the processor to perform operations. The operations include presenting an extended reality environment to a first user, wherein the extended reality environment combines elements of a real world environment surrounding the first user with elements of a virtual world, inferring a marker to be associated with a second user in the extended reality environment, wherein the marker indicates information about the second user; and modifying the extended reality environment to incorporate the marker in a manner that is apparent to the first user.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure enhances social engagement among users in extended reality (XR) environments by generating and displaying markers that allow users to advertise information about themselves (e.g., background, interests, etc.). As discussed above, immersive experiences that rely on XR technologies are growing in popularity. However, social interactions in the XR space are often poorly matched to common indicators that in-person social interactions assume natural, and this may make it difficult for users in the XR space to identify other users with whom they share common interests. For example, a person can easily identify other fans of his favorite sports teams in person, e.g., by observing branded clothing, styles, and the like. In the XR space, however, information about sports fandoms may be hidden or represented in a non-intuitive manner (e.g., numerically, in a third-party database).

Moreover, software manifestations like trackers and other analytics may be deployed to follow users through the XR space, often unbeknownst to the users. This may allow the software manifestations to observe private conversations, new environments, and other events without the users; knowledge. For instance, if a first user clicks on a tracker and later joins a second user in a virtual room, the tracker code may follow the first user into the room, unbeknownst to the first user and/or the second user. This may make some users wary of social engagement in the XR space.

Examples of the present disclosure visually alter the avatar or visible online presence of a user in an XR environment to display information about the user. The alteration may take the form of a marker that indicates the information. For instance, the marker may comprise a graphic similar to an emoji. The graphic may indicate information about the user, such as the user's background (e.g., alma mater, home town, etc.), interests (e.g., favorite sports teams, hobbies, etc.), and/or current connectivity conditions (e.g., current network connection speed, applications or services currently logged into, etc.). The information indicated by the graphic may be learned from the user's profile, observation of the user's current online behavior, or in other ways. Moreover, the graphic may be associated with the user automatically (e.g., by a computing system that controls or has some input into the XR environment), in response to a request by the user (e.g., such that the user controls what is displayed to other users), or in response to a request by another user in the XR environment (e.g., in which case, the graphic may be visible only to the other user who requested the marker). In one example, the user is given the opportunity to approve any marker before that marker is associated with the user.

Figure 1:
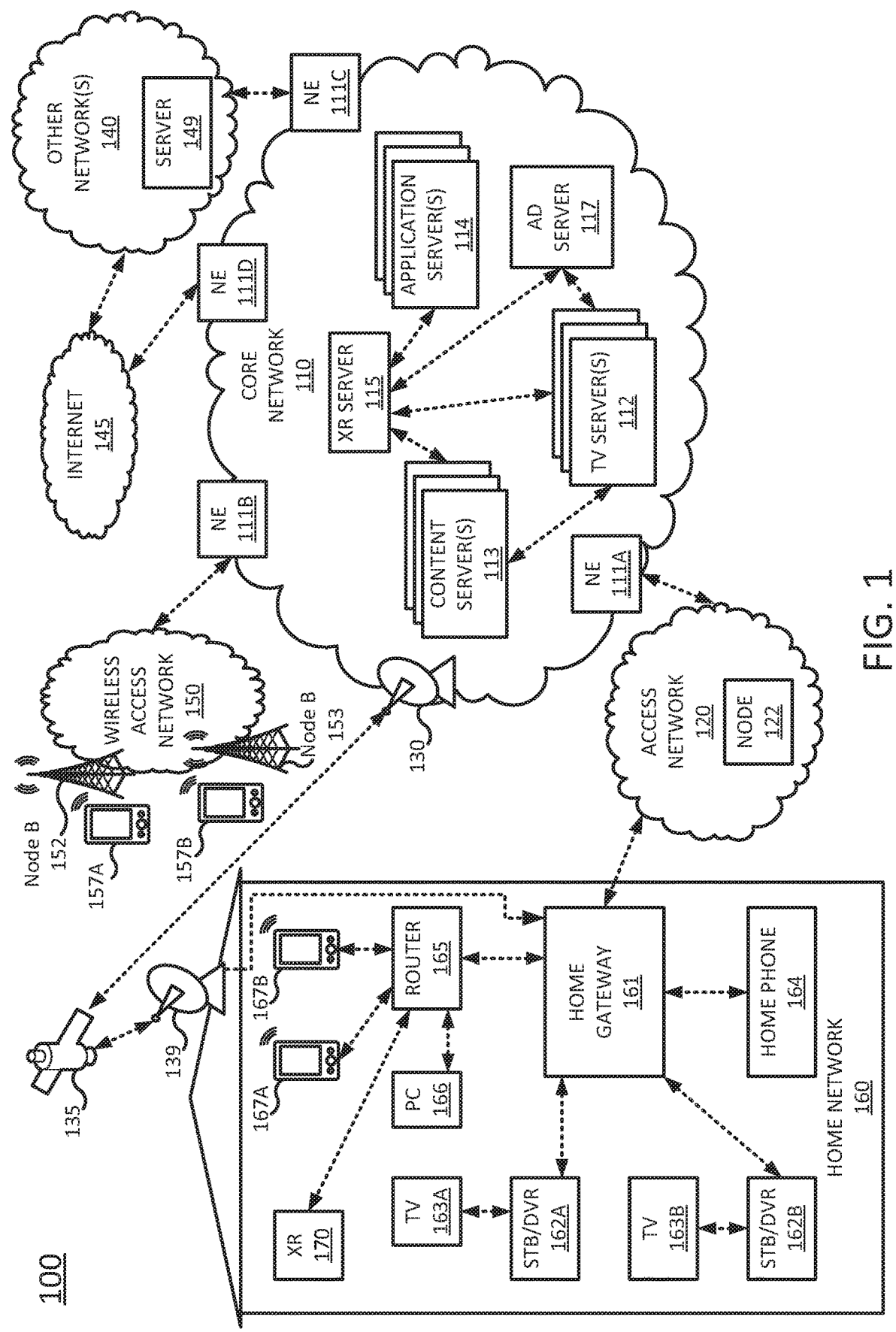
FIG. 1 illustrates an example network related to the present disclosure.

To better understand the present disclosure, FIG. 1 illustrates an example network 100, related to the present disclosure. As shown in FIG. 1, the network 100 connects mobile devices 157A, 157B, 167A and 167B, and home network devices such as home gateway 161, set-top boxes (STBs) 162A, and 162B, television (TV) 163A and TV 163B, home phone 164, router 165, personal computer (PC) 166, and so forth, with one another and with various other devices via a core network 110, a wireless access network 150 (e.g., a cellular network), an access network 120, other networks 140 and/or the Internet 145.

In one example, wireless access network 150 comprises a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, wireless access network 150 may comprise an access network in accordance with any "second generation" (2G), "third generation" (3G), "fourth generation" (4G), Long Term Evolution (LTE) or any other yet to be developed future wireless/cellular network technology including "fifth generation" (5G) and further generations. While the present disclosure is not limited to any particular type of wireless access network, in the illustrative example, wireless access network 150 is shown as a UMTS terrestrial radio access network (UTRAN) subsystem. Thus, elements 152 and 153 may each comprise a Node B or evolved Node B (eNodeB).

In one example, each of mobile devices 157A, 157B, 167A, and 167B may comprise any subscriber/customer endpoint device configured for wireless communication such as a laptop computer, a Wi-Fi device, a Personal Digital Assistant (PDA), a mobile phone, a smartphone, an email device, a computing tablet, a messaging device, a wearable smart device (e.g., a smart watch or fitness tracker), a gaming console, and the like. In one example, any one or more of mobile devices 157A, 157B, 167A, and 167B may have both cellular and non-cellular access capabilities and may further have wired communication and networking capabilities.

As illustrated in FIG. 1, network 100 includes a core network 110. In one example, core network 110 may combine core network components of a cellular network with components of a triple play service network; where triple play services include telephone services, Internet services and television services to subscribers. For example, core network 110 may functionally comprise a fixed mobile convergence (FMC) network, e.g., an IP Multimedia Subsystem (IMS) network. In addition, core network 110 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Core network 110 may also further comprise a broadcast television network, e.g., a traditional cable provider network or an Internet Protocol Television (IPTV) network, as well as an Internet Service Provider (ISP) network. The network elements 111A-111D may serve as gateway servers or edge routers to interconnect the core network 110 with other networks 140, Internet 145, wireless access network 150, access network 120, and so forth. As shown in FIG. 1, core network 110 may also include a plurality of television (TV) servers 112, a plurality of content servers 113, a plurality of application servers 114, an advertising server (AS) 117, and an extended reality (XR) server 115 (e.g., an application server). For ease of illustration, various additional elements of core network 110 are omitted from FIG. 1.

With respect to television service provider functions, core network 110 may include one or more television servers 112 for the delivery of television content, e.g., a broadcast server, a cable head-end, and so forth. For example, core network 110 may comprise a video super hub office, a video hub office and/or a service office/central office. In this regard, television servers 112 may interact with content servers 113, advertising server 117, and XR server 115 to select which video programs, or other content and advertisements to provide to the home network 160 and to others.

In one example, content servers 113 may store scheduled television broadcast content for a number of television channels, video-on-demand programming, local programming content, gaming content, and so forth. The content servers 113 may also store other types of media that are not audio/video in nature, such as audio-only media (e.g., music, audio books, podcasts, or the like) or video-only media (e.g., image slideshows). For example, content providers may upload various contents to the core network to be distributed to various subscribers. Alternatively, or in addition, content providers may stream various contents to the core network for distribution to various subscribers, e.g., for live content, such as news programming, sporting events, and the like. In one example, advertising server 117 stores a number of advertisements that can be selected for presentation to viewers, e.g., in the home network 160 and at other downstream viewing locations. For example, advertisers may upload various advertising content to the core network 110 to be distributed to various viewers.

In one example, XR server 115 may generate digital overlays that may be superimposed over images of a "real world" environment (e.g., a real environment surrounding a user) to produce an extended reality environment. For instance, the digital overlays may include renderings of virtual objects that do not exist in the "real world" environment, such as graphics, text, and the like. However, when the digital overlays are superimposed over images of the "real world" environment (e.g., over a live video stream), it may appear to a viewer that the virtual objects are present in the "real world" environment. In one example, the digital overlays generated by the XR server may include markers that indicate information about people, places, or objects that are present in the "real world" environment. The digital overlays may also include graphics, text, and the like that do not function as markers (e.g., do not convey any information about people, places, or objects that are present in the "real world" environment), but that serve some other purpose in the XR environment (e.g., interactive gaming or training elements).

Figure 2:
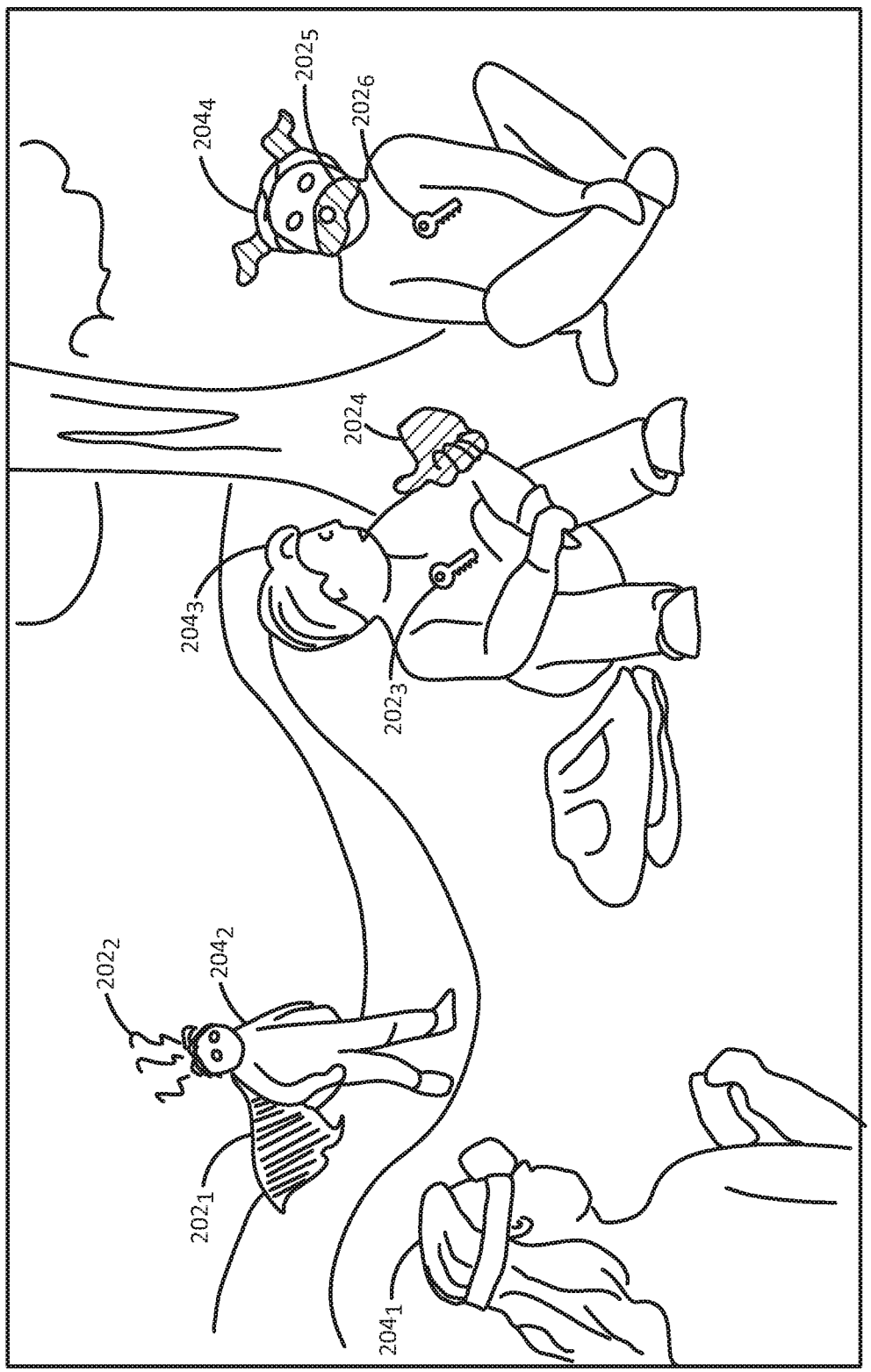
FIG. 2 illustrates an image of an example extended reality environment that may be generated by the extended reality server of FIG. 1.

FIG. 2, for instance, illustrates an image of an example extended reality environment 200 that may be generated by the extended reality server 115 of FIG. 1. In this example, the "real world" portion of the XR environment 200 depicts a plurality of individuals $204_1$-$204_4$ (hereinafter individually referred to as an "individual 204" or collectively referred to as "individuals 204") in an outdoor setting. The "virtual" portion of the XR environment may depict a plurality of markers $202_1$-$202_6$ (hereinafter individually referred to as a "marker 202" or collectively referred to as "markers 202"), which are illustrated as being shaded in.

As illustrated, the markers 202 may indicate information about the individuals with whom the markers 202 are associated. Each different marker 202 may have a different meaning, and may take an appearance that is associated with that meaning. For example, the marker $202_1$, which resembles a super hero cape, may indicate that the individual $204_2$ is a fan of fantasy and/or adventure media (e.g., movies, comics, television shows, etc.). The marker $202_2$, which resembles a set of wiggly lines, may indicate that the individual $204_2$ has recently experienced one or more failed attempts to log into an XR system or application (e.g., as hosted by the XR server 115). The markers $202_3$ and $202_6$, which resemble keys, may indicate that the individuals $204_3$ and $204_4$ have logged into the XR system or application with authenticated accounts. The marker $202_4$, which resembles a thumbs up, may indicate that the individual $204_3$ is a frequent gamer. The marker $202_5$, which resemble a dog's snout and ears, may indicate that the individual $204_4$ is a dog lover.

Referring back to FIG. 1, in one example the XR server 115 may collect data provided by users of the network 100. The collected data may be provided directly to the XR server 115 by the users, e.g., via the mobile devices 157A, 157B, 167A, and 167B, the PC 166, the home phone 164, the TVs 163A and 163B, and/or XR devices 170. Alternatively, the data may be retrieved from network storage, e.g., application servers 114, by the XR server 115. For instance the collected data may comprise user profiles maintained by a network service (e.g., an Internet service provider, a streaming media service, a gaming subscription, etc.), portions of social media profiles maintained by a social media web site (e.g., a social networking site, a blogging site, a photo-sharing site, etc.). The data may indicate information about the users, such as the users' backgrounds (e.g., alma mater, home town, etc.), interests (e.g., favorite sports teams, hobbies, etc.), and/or current connectivity conditions (e.g., current network connection speed, applications or services currently logged into, etc.).

In a further example, the XR server 115 may generate a marker for an individual who appears in an image of a "real world" setting, where the appearance of the marker is designed to indicate at least some of the collected information about the individual. For instance, as discussed above, if the individual's user profile indicates that he is a dog lover, the XR server may generate a marker for the individual that resembles a dog's snout and ears. In one example, the XR server 115 may generate the marker automatically (e.g., in response to the individual logging into an XR system or application), in response to a request by the individual (e.g., such that the individual controls what is displayed to other users of the XR system or application), or in response to a request by another user of the XR system or application (e.g., in which case, the marker may be visible only to the other user who requested the marker). In one example, the individual may be given the opportunity to approve any marker before that marker is associated with the individual.

Figure 4:
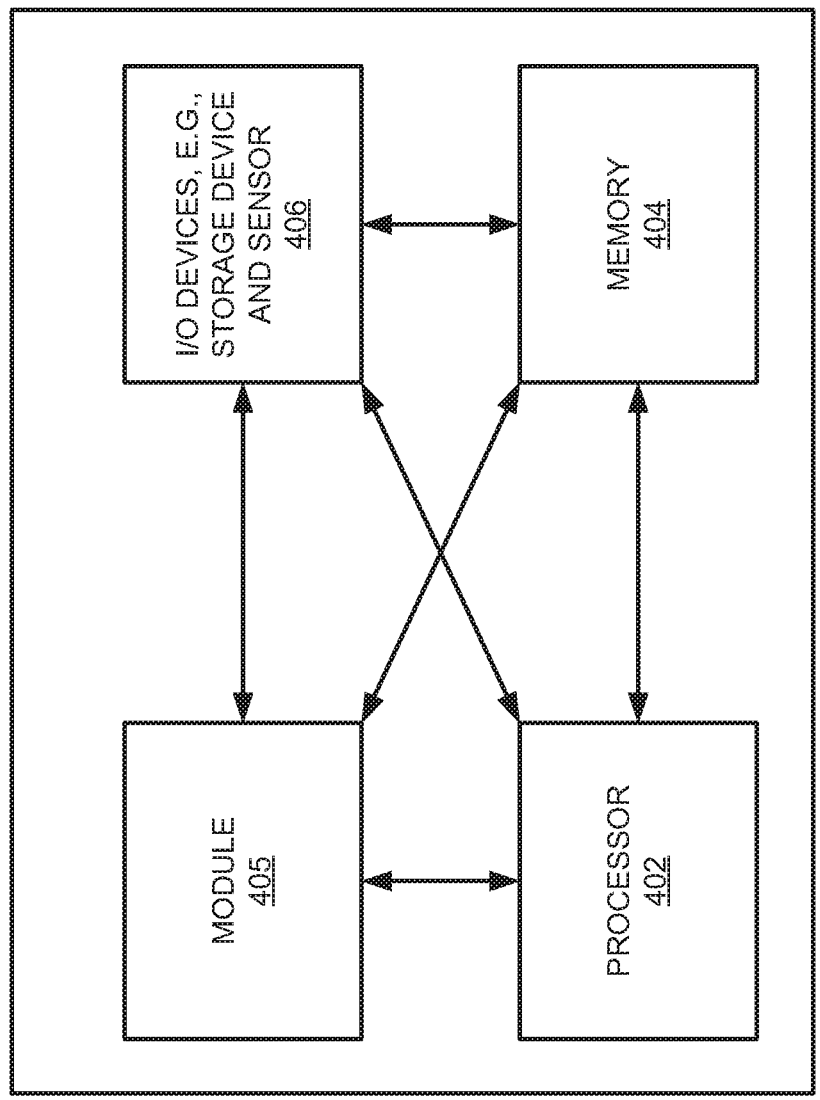
FIG. 4 depicts a high-level block diagram of a computing device specifically programmed to perform the functions described herein.

In one example, any or all of the television servers 112, content servers 113, application servers 114, XR server 115, and advertising server 117 may comprise a computing system, such as computing system 400 depicted in FIG. 4.

In one example, the access network 120 may comprise a Digital Subscriber Line (DSL) network, a broadband cable access network, a Local Area Network (LAN), a cellular or wireless access network, a $3^{rd}$ party network, and the like. For example, the operator of core network 110 may provide a cable television service, an IPTV service, or any other type of television service to subscribers via access network 120.

In this regard, access network 120 may include a node 122, e.g., a mini-fiber node (MFN), a video-ready access device (VRAD) or the like. However, in another example node 122 may be omitted, e.g., for fiber-to-the-premises (FTTP) installations. Access network 120 may also transmit and receive communications between home network 160 and core network 110 relating to voice telephone calls, communications with web servers via the Internet 145 and/or other networks 140, and so forth.

Alternatively, or in addition, the network 100 may provide television services to home network 160 via satellite broadcast. For instance, ground station 130 may receive television content from television servers 112 for uplink transmission to satellite 135. Accordingly, satellite 135 may receive television content from ground station 130 and may broadcast the television content to satellite receiver 139, e.g., a satellite link terrestrial antenna (including satellite dishes and antennas for downlink communications, or for both downlink and uplink communications), as well as to satellite receivers of other subscribers within a coverage area of satellite 135. In one example, satellite 135 may be controlled and/or operated by a same network service provider as the core network 110. In another example, satellite 135 may be controlled and/or operated by a different entity and may carry television broadcast signals on behalf of the core network 110.

In one example, home network 160 may include a home gateway 161, which receives data/communications associated with different types of media, e.g., television, phone, and Internet, and separates these communications for the appropriate devices. The data/communications may be received via access network 120 and/or via satellite receiver 139, for instance. In one example, television data is forwarded to set-top boxes (STBs)/digital video recorders (DVRs) 162A and 162B to be decoded, recorded, and/or forwarded to television (TV) 163A and TV 163B for presentation. Similarly, telephone data is sent to and received from home phone 164; Internet communications are sent to and received from router 165, which may be capable of both wired and/or wireless communication. In turn, router 165 receives data from and sends data to the appropriate devices, e.g., personal computer (PC) 166, mobile devices 167A and 167B, XR device 170, and so forth. In one example, router 165 may further communicate with TV (broadly a display) 163A and/or 163B, e.g., where one or both of the televisions is a smart TV. In one example, router 165 may comprise a wired Ethernet router and/or an Institute for Electrical and Electronics Engineers (IEEE) 802.11 (Wi-Fi) router, and may communicate with respective devices in home network 160 via wired and/or wireless connections.

In one example, the XR device 170 comprises a device that is capable of rendering a virtual environment that, when experienced simultaneously with a surrounding real environment, creates an XR environment. For instance, the XR device 170 may comprise a head mounted display (HMD). In addition, any of the mobile devices 157A, 157B, 167A, and 167B may comprise or may double as an XR device. For instance, a gaming device or a mobile phone may render XR content.

It should be noted that as used herein, the terms "configure" and "reconfigure" may refer to programming or loading a computing device with computer-readable/computer-executable instructions, code, and/or programs, e.g., in a memory, which when executed by a processor of the computing device, may cause the computing device to perform various functions. Such terms may also encompass providing variables, data values, tables, objects, or other data structures or the like which may cause a computer device executing computer-readable instructions, code, and/or programs to function differently depending upon the values of the variables or other data structures that are provided. For example, one or both of the STB/DVR 162A and STB/DVR 162B may host an operating system for presenting a user interface via TVs 163A and 163B, respectively. In one example, the user interface may be controlled by a user via a remote control or other control devices which are capable of providing input signals to a STB/DVR. For example, mobile device 167A and/or mobile device 167B may be equipped with an application to send control signals to STB/DVR 162A and/or STB/DVR 162B via an infrared transmitter or transceiver, a transceiver for IEEE 802.11 based communications (e.g., "Wi-Fi"), IEEE 802.15 based communications (e.g., "Bluetooth", "ZigBee", etc.), and so forth, where STB/DVR 162A and/or STB/DVR 162B are similarly equipped to receive such a signal. Although STB/DVR 162A and STB/DVR 162B are illustrated and described as integrated devices with both STB and DVR functions, in other, further, and different examples, STB/DVR 162A and/or STB/DVR 162B may comprise separate STB and DVR components.

Those skilled in the art will realize that the network 100 may be implemented in a different form than that which is illustrated in FIG. 1, or may be expanded by including additional endpoint devices, access networks, network elements, application servers, etc. without altering the scope of the present disclosure. For example, core network 110 is not limited to an IMS network. Wireless access network 150 is not limited to a UMTS/UTRAN configuration. Similarly, the present disclosure is not limited to an IP/MPLS network for VoIP telephony services, or any particular type of broadcast television network for providing television services, and so forth.

Figure 3:
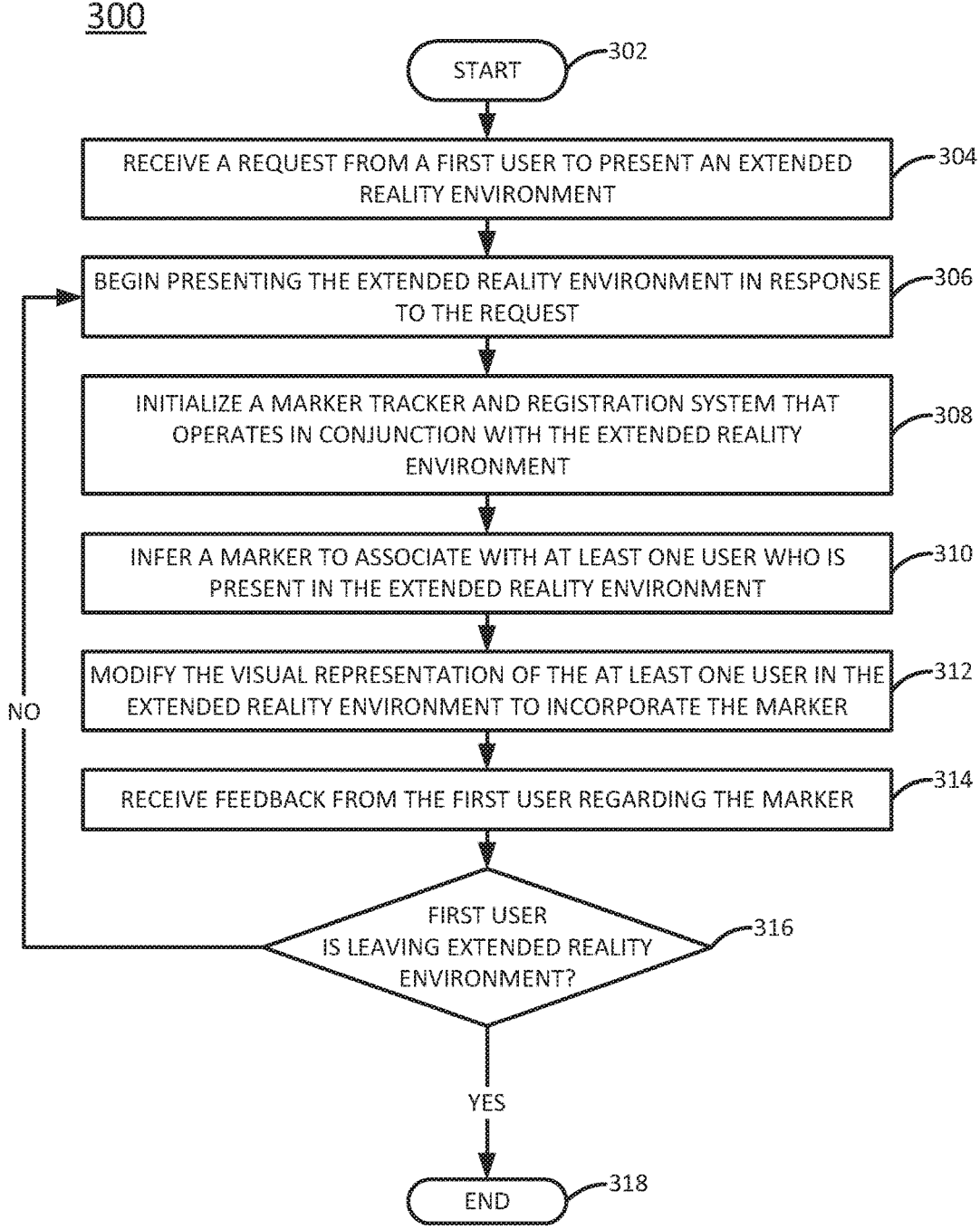
FIG. 3 illustrates a flowchart of a method for generating and displaying markers in extended reality environments to enhance social engagement among users in accordance with the present disclosure.

To further aid in understanding the present disclosure, FIG. 3 illustrates a flowchart of a method 300 for generating and displaying markers in extended reality environments to enhance social engagement among users in accordance with the present disclosure. In one example, the method 300 may be performed by an XR server that is configured to generate digital overlays that may be superimposed over images of a "real world" environment to produce an extended reality environment, such as the XR server 115 illustrated in FIG. 1. However, in other examples, the method 300 may be performed by another device, such as the processor 402 of the system 400 illustrated in FIG. 4. For the sake of example, the method 300 is described as being performed by a processing system.

The method 300 beings in step 302. In step 304, the processing system may receive a request to present an XR environment. The request may comprise, for example, a first user logging into an XR system or application. Alternatively, the request may comprise an explicit request from the first user to begin presenting the XR environment, where the first user is already logged into an XR system or application.

In step 306, the processing system may begin presenting the XR environment in response to the request. In one example, presenting the XR environment involves superimposing a digital overlay over images (e.g., a video) of a "real world" environment (e.g., as may be captured by a camera that provides the images to the processing system). The digital overlay may comprise one or more virtual objects that are not present in the "real world" environment, but that appear to be present in the "real world" environment when the digital overlay is superimposed.

In step 308, the processing system may initialize a marker tracker and registration system in conjunction with the XR environment. The marker tracker and registration system may detect markers that are associated with other users of the XR system or application, and may take action based on the detected markers and/or on preferences of the first user.

For instance, the marker tracker and registration system may waypoint toward or away from markers or types of markers specified by the first user. As an example, if the first user's profile indicates that the first user is a fan of a specific baseball team, the marker tracker and registration system may locate and identify to the first user other users in the XR environment whose markers indicate that the other users are also fans of that baseball team. The first user may also specifically ask the marker tracker and registration system to locate other fans of the baseball team. Alternatively, if the first user's profile indicates that the first user does not wish to experience a certain type of content (e.g., explicit content, swearing, etc.), then the marker tracker and registration system may locate and avoid identifying to the first user (or filter out) other users in the XR environment whose markers indicate that the other users have presented introduced that type of content into the XR environment. Filtering out other users may involve muting the other users, preventing the other users from sending content to the first user, and/or preventing the first user from sending content to the other users.

In another example, the marker tracker and registration system may present the first user with a summary or report of the other users who are presented in the XR environment. For instance, the summary may take the form of a bar graph, where the bar graph indicates the numbers of other users in the XR environment who have specific markers associated (e.g., x other users are associated with a marker that indicates strong network connectivity, y other users are associated with a marker that indicates animal lovers, z other users are associated with a marker that indicates interest in super hero movies, etc.).

In step 310, the processing system may infer a marker to associate with at least one user (e.g., the first user or another, second user) who is present in the XR environment. In one example, the marker may be inferred by examining a profile or other identifying information associated with the at least one user. For instance, the at least one user may have a profile maintained by the XR system or application that indicates the at least one user's interests, demographic information (e.g., age, location, gender, etc.), usage history, and the like. Alternatively, the profile or similar information may be retrieved from a source that is external to the XR system or application, if identifying information about the at least one user is known. For instance, the at least one user's profile may identify social media accounts or other sources of information associated with the at least one user.

In another example, the marker may be inferred from a request by the at least one user. For instance, the at least one user may explicitly ask to be associated with specific markers. In one example, a menu of available markers may be presented to the at least one user, and the at least one user may select one or more of the markers from the menu. The markers requested by the at least one user may be displayed to all other users in the XR environment or to specific subsets of users in the XR environment, depending upon the preferences of the at least one user.

In another example, the marker may be inferred from a request by another user, i.e., other than the at least one user. For instance, the first user may request that a specific marker be associated with the at least one user, where the marker may only be visible to the first user. As an example, if the first user finds the at least one user to be funny, the first user may request that a marker such as a laughing emoji be associated with the at least one user. Alternatively, if the at least one user swears, and the first user does not want to interact with other users who swear, the first user may ask that a marker such as a grawlix be associated with the at least one user. In further examples, the processing system may learn from markers that are specifically requested by the first user in this manner, and may begin to automatically infer markers for other users even when the first user does not request it. For instance, continuing the example of the marker that indicates swearing, if the processing system detects another user swearing, the processing system may automatically infer that that other user should have an associated marker to indicate swearing. Thus, behavioral learning techniques may be employed to learn the types of markers that may be meaningful to the first user, and the types of behaviors with which the markers are associated.

In another example, a marker may be inferred from biometric information. For instance, the processing system may be in communication with sensors that monitor the at least one user's heartbeat, facial expressions, skin conductivity, and the like. Thus, if the at least one user's facial expression indicates that the at least one user is happy, a marker indicating happiness (e.g., a smiling emoji) may be inferred for the at least one user.

In another example, the marker may be required by the XR system or application. For instance, markers that indicate whether a user is logging into the XR system or application via a secure connection (e.g., via a virtual private network or authenticated by another service) may be required. In another example, markers of different colors may be used to indicate the speed of a user's network connection.

In another example, the marker may indicate a social or proximal relationship between users. For instance, if the at least one user is the parent of another user who is also present in the XR environment, the at least one user may be associated with a marker indicating the parental relationship (which, in turn, may help to identify potentially sensitive audiences). In another, example, the marker may indicate whether a software tracker or other potentially malicious software is associated with the first user.

In another example, the marker may indicate historical behaviors of the at least one user. For instance, if the at least one user routinely orders tea in a coffee shop, the marker could indicate that the at least one user is a tea drinker. The marker could then assist the coffee chop employees in better serving the at least one user as a customer.

Markers may be ephemeral or persistent. For example, markers that indicate the first user's present state may change or evolve over time. As an example, if the first user logs in to the XR system or application in the morning, after going for a run, a marker associated with the first user in the morning might comprise a sweatband superimposed over the first user's head. However, if the first user remains logged in for several hours, the sweatband marker may disappear after some predefined period of time (e.g., one hour). On the other hand, other markers, such as markers that indicate the security of the at least one user's network connection, may persist for the duration of the at least one user's presence in the XR environment. Thus, not all markers are static.

In step 312, the processing system may modify the XR environment to incorporate at least one marker that was inferred in step 310 in a manner that is apparent to the first user (e.g., so that the first user can infer information about the second user without directly interacting with the second user). For instance, the processing system may modify the visual representation of the at least one user (e.g., the at least one user's avatar) in the XR environment. In one example, modification of the visual representation may involve generating or adding to a digital overlay, such that the digital overlay includes the at least one marker. The marker may appear on or near the visual representation of the at least one user as a badge or photo filter, e.g., as illustrated in FIG. 2.

In some examples, rather than rendering a visible marker, the processing system may generate a marker that takes another form, such as an audible marker or a tactile marker. For instance, in some examples, the marker may comprise an audio clip that is played when the first user approaches or attempts to interact with (e.g., clicks on) the visual representation of the at least one user. As an example, if the at least one user is a dog lover, an audible marker associated with the at least one user may sound like a dog barking. In other examples, the marker may comprise some form of tactile or haptic feedback that is generated when the first user approaches or attempts to interact with the visual representation of the at least one user. For instance, if the at least one user's network connection is not secure, a haptic marker associated with the at least one user may generate a vibration in a controller or other device operated by the first user.

In some examples, the processing system may solicit permission from the at least one user before associating a marker with the at least one user. For instance, if the marker is a marker that is required by the XR system of application, the processing system may notify the at least one user of the required markers that will be associated with the at least one user. The at least one user may choose to stay in the XR environment (e.g., tacitly giving permission for the markers) or may choose to leave the XR environment (e.g., tacitly declining permission for the markers). Additionally, if a user other than the at least one user requested the marker, the processing system may notify the at least one user that another user has requested association of the marker with the at least one user.

In step 314, the processing system may receive feedback from the first user regarding the markers. For instance, the feedback may comprise a request that an automatically generated marker (associated with the first user or with the at least one user, when the at least one user is not the first user) be removed. Alternatively, the feedback may comprise a request to modify, rather than remove, a marker.

In step 316, the processing system may determine whether the first user has generated a signal to indicate that he or she is leaving the XR environment. For instance, the first user may pause the XR environment, may log out of the XR system or application, or may lose network connectivity.

If the processing system determines in step 316 that no signal has been generated to indicate that the first user is leaving the XR environment, then the method 300 may return to step 306 and may proceed as described above to continue presenting the XR environment, including markers. However, inference and generation of the markers may be modified in response to the user feedback received in step 314 and/or in response to changes in the XR environment (e.g., changes in user behaviors, new users entering the XR environment, existing user leaving the XR environment, etc.).

If, however, the processing system determines in step 316 that a signal has been generated to indicate that the first user is leaving the XR environment, then the method 300 may end in step 318.

Thus, the method 300 allows social implications to be manifested in XR avatars as visual, audible, or tactile interaction markers. This allows users to easily recognize family, friends, other users who share similar interests, other users with whom users may not want to interact (for security, behavioral, and/or other reasons), and the like, without verbose interactions. The markers may be generated automatically by a processing system, based on system rules and interactions, which may allow the markers to be more trustworthy than user-generated markers.

Examples of the present disclosure may also allow markers to be easily visually conveyed within social experiences, without requiring explicit text or speech. For instance, a group of users may be "tagged" or marked with a marker to indicate that the group comprises guests at a birthday party. This may allow markers to be used to organize surprise parties, flash mobs, and the like.

Further examples of the present disclosure may enable the enforcement of parental control in XR environments. For instance, users with a certain marker (e.g., a "child" marker) may be prohibited from interacting with certain types of content or performing certain types of actions in the XR environment. Conversely, certain markers could be used to permit access to real-world systems such as Internet or Things (IoT) systems, locks, software applications, security cameras, or the like.

Although not expressly specified above, one or more steps of the method 300 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 3 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the examples of the present disclosure.

FIG. 4 depicts a high-level block diagram of a computing device specifically programmed to perform the functions described herein. For example, any one or more components or devices illustrated in FIG. 1 or described in connection with the method 300 may be implemented as the system 400. For instance, a server (such as might be used to perform the method 300) could be implemented as illustrated in FIG. 4.

As depicted in FIG. 4, the system 400 comprises a hardware processor element 402, a memory 404, a module 405 for generating and displaying markers in extended reality environments to enhance social engagement among users, and various input/output (I/O) devices 406.

The hardware processor 402 may comprise, for example, a microprocessor, a central processing unit (CPU), or the like. The memory 404 may comprise, for example, random access memory (RAM), read only memory (ROM), a disk drive, an optical drive, a magnetic drive, and/or a Universal Serial Bus (USB) drive. The module 405 for generating and displaying markers in XR environments to enhance social engagement among users may include circuitry and/or logic for performing special purpose functions relating to the operation of a home gateway or XR server. The input/output devices 406 may include, for example, a camera, a video camera, storage devices (including but not limited to, a tape drive, a floppy drive, a hard disk drive or a compact disk drive), a receiver, a transmitter, a speaker, a display, a speech synthesizer, an output port, and a user input device (such as a keyboard, a keypad, a mouse, and the like), or a sensor.

Although only one processor element is shown, it should be noted that the computer may employ a plurality of processor elements. Furthermore, although only one computer is shown in the Figure, if the method(s) as discussed above is implemented in a distributed or parallel manner for a particular illustrative example, i.e., the steps of the above method(s) or the entire method(s) are implemented across multiple or parallel computers, then the computer of this Figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for generating and displaying markers in XR environments to enhance social engagement among users (e.g., a software program comprising computer-executable instructions) can be loaded into memory 404 and executed by hardware processor element 402 to implement the steps, functions or operations as discussed above in connection with the example method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for generating and displaying markers in XR environments to enhance social engagement among users (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described example examples, but should be defined only in accordance with the following claims and their equivalents.

What is claimed is:

1. A method comprising:
presenting, by a processing system, an extended reality environment to a first user, wherein the extended reality environment combines elements of a real world environment surrounding the first user with elements of a virtual world;
receiving, by the processing system, a request from the first user to associate a marker with a second user in the extended reality environment, wherein the marker indicates information about the second user, wherein the information about the second user includes a connectivity status of the second user, wherein the connectivity status comprises at least one of: a current network connection speed of a network connection of the second user, an application currently logged into by the second user or a service currently logged into by the second user; and
modifying, by the processing system, the extended reality environment to incorporate the marker, wherein the marker indicates the connectivity status of the second user to the first user in a manner that is visible to, audible to, or tactilely felt by the first user but is not visible to, audible to, or tactilely felt by other users of the extended reality environment who are interacting with the second user.

2. The method of claim 1, wherein the marker allows the first user to infer the information about the second user without directly interacting with the second user.

3. The method of claim 1, further comprising:
reviewing, by the processing system, a profile of the second user for the information about the second user.

4. The method of claim 1, further comprising:
reviewing, by the processing system, data from a source that is external to the extended reality environment for the information about the second user.

5. The method of claim 1, further comprising:
learning, by the processing system, an event that triggered the request from the first user; and
inferring, by the processing system, an association of the marker with a third user in the extended reality environment, based on the learning.

6. The method of claim 1, further comprising:
receiving, by the processing system, a request from the second user to associate another marker with the second user.

7. The method of claim 1, further comprising:
receiving, by the processing system, biometric information about the second user from a sensor, wherein the biometric information indicates the information about the second user.

8. The method of claim 1, wherein the information about the second user further includes an interest of the second user.

9. The method of claim 1, wherein the information about the second user further includes demographic information about the second user.

10. The method of claim 1, wherein the information about the second user further includes a behavior of the second user in the extended reality environment.

11. The method of claim 1, wherein the modifying comprises:

generating, by the processing system, a visual digital overlay including the marker; and
superimposing the visual digital overlay on at least one of the elements of the real world environment.

12. The method of claim 1, further comprising:
modifying, by the processing system, the marker to indicate a change in the information about the second user.

13. A non-transitory computer-readable medium storing instructions which, when executed by a processor, cause the processor to perform operations, the operations comprising:
presenting an extended reality environment to a first user, wherein the extended reality environment combines elements of a real world environment surrounding the first user with elements of a virtual world;
receiving a request from the first user to associate a marker with a second user in the extended reality environment, wherein the marker indicates information about the second user, wherein the information about the second user includes a connectivity status of the second user, wherein the connectivity status comprises at least one of: a current network connection speed of a network connection of the second user, an application currently logged into by the second user or a service currently logged into by the second user; and
modifying the extended reality environment to incorporate the marker, wherein the marker indicates the connectivity status of the second user to the first user in a manner that is visible to, audible to, or tactilely felt by the first user but is not visible to, audible to, or tactilely felt by other users of the extended reality environment who are interacting with the second user.

14. A device comprising:
a processor; and
a computer-readable medium storing instructions which, when executed by the processor, cause the processor to perform operations, the operations comprising:
presenting an extended reality environment to a first user, wherein the extended reality environment combines elements of a real world environment surrounding the first user with elements of a virtual world;
receiving a request from the first user to associate a marker with a second user in the extended reality environment, wherein the marker indicates information about the second user, wherein the information about the second user includes a connectivity status of the second user, wherein the connectivity status comprises at least one of: a current network connection speed of a network connection of the second user, an application currently logged into by the second user or a service currently logged into by the second user; and
modifying the extended reality environment to incorporate the marker, wherein the marker indicates the connectivity status of the second user to the first user in a manner that is visible to, audible to, or tactilely felt by the first user but is not visible to, audible to, or tactilely felt by other users of the extended reality environment who are interacting with the second user.

15. The non-transitory computer-readable medium of claim 13, wherein the marker allows the first user to infer the information about the second user without directly interacting with the second user.

16. The non-transitory computer-readable medium of claim 13, the operations further comprising:

learning an event that triggered the request from the first user; and inferring an association of the marker with a third user in the extended reality environment, based on the learning.

17. The non-transitory computer-readable medium of claim 13, wherein the information about the second user further includes an interest of the second user.

18. The non-transitory computer-readable medium of claim 13, wherein the information about the second user further includes demographic information about the second user.

19. The non-transitory computer-readable medium of claim 13, wherein the information about the second user further includes a behavior of the second user in the extended reality environment.

20. The non-transitory computer-readable medium of claim 13, wherein the operations further comprise:

modifying the marker to indicate a change in the information about the second user.

* * * * *